United States Patent
Katayama

(10) Patent No.: US 11,523,015 B1
(45) Date of Patent: Dec. 6, 2022

(54) IMAGE FORMING APPARATUS

(71) Applicant: TOSHIBA TEC KABUSHIKI KAISHA, Tokyo (JP)

(72) Inventor: Yosuke Katayama, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/407,385

(22) Filed: Aug. 20, 2021

(51) Int. Cl.
*H04N 1/00* (2006.01)

(52) U.S. Cl.
CPC ....... *H04N 1/00702* (2013.01); *H04N 1/0057* (2013.01); *H04N 1/00771* (2013.01); *H04N 1/00777* (2013.01); *H04N 2201/0094* (2013.01)

(58) Field of Classification Search
CPC ........... H04N 1/00912; H04N 1/32026; H04N 1/32138; H04N 2201/0094; H04N 2201/0098; H04N 2201/3204; H04N 2201/3205; H04N 2201/3209; H04N 2201/3274; H04N 2201/3278; H04N 2201/33392; G01B 7/003; G01B 7/023; G01B 7/14; B65H 2511/13; B65H 2511/524; B65H 2515/34; B65H 2553/21; B65H 2701/1912; B65H 7/12; B65H 2404/1341; B65H 2404/18; B65H 2404/185; B65H 2404/186; B65H 2511/11; B65H 2515/70; B65H 2515/708; B65H 27/00; B65H 3/5238; B65H 2511/51; B65H 2511/515; B65H 2515/112; B65H 2553/23; B65H 2557/61; B65H 7/02; G06K 9/00; G06K 7/081; G06K 13/00; G06K 13/08; G06K 13/0806; G06K 13/085; G06K 13/0862; G06K 13/0868; G06K 13/0875; G06K 13/0881; G06K 7/0004;
(Continued)

(56) References Cited

U.S. PATENT DOCUMENTS 7,548,635 B2 * 6/2009 Kojima .............. H04N 1/00846
235/462.46
2002/0170973 A1 * 11/2002 Teraura .............. G06K 19/0723
235/492
(Continued)

*Primary Examiner* — Negussie Worku
(74) *Attorney, Agent, or Firm* — Amin, Turocy & Watson, LLP

(57) ABSTRACT

According to one embodiment, an image forming apparatus includes a conveyance system, a capacitance sensor, a processor, an image forming mechanism, and a tag writer. The conveyance system conveys paper. The capacitance sensor detects a value indicating the capacitance at a plurality of detection positions for the paper conveyed by the conveyance system. The processor detects that the paper conveyed by the conveyance system is provided with an RFID tag, and that the paper is being conveyed without overlapping with other paper based on the value indicating the capacitance detected at a plurality of detection positions by the capacitance sensor. If the processor detects that the paper is provided with an RFID tag and is conveyed without overlapping with other paper, the image forming mechanism forms an image on the paper. The tag writer writes data to the RFID tag provided on the paper on which the image forming mechanism forms the image.

20 Claims, 4 Drawing Sheets

(58) Field of Classification Search
CPC .... G06K 7/0008; G06K 7/003; G06K 7/0078; G06K 7/0091; G06K 7/082; G06K 7/10
USPC .......................................................... 358/1.1
See application file for complete search history.

(56) References Cited

U.S. PATENT DOCUMENTS

| | | | |
|---|---|---|---|
| 2005/0094183 A1* | 5/2005 | Kojima | H04N 1/00342 358/1.14 |
| 2006/0176511 A1* | 8/2006 | Tagawa | G06F 3/1284 358/1.15 |
| 2008/0204818 A1* | 8/2008 | Nakano | H04N 1/32384 358/1.15 |
| 2008/0239406 A1* | 10/2008 | Nakano | H04N 1/00832 358/401 |
| 2008/0239408 A1* | 10/2008 | Urakawa | H04N 1/32026 358/435 |
| 2010/0110497 A1* | 5/2010 | Oh | H04N 1/0084 358/3.28 |
| 2010/0127068 A1* | 5/2010 | Tsuzuki | H04N 1/00795 235/475 |
| 2015/0097027 A1* | 4/2015 | Jacomet | G07D 11/0096 235/375 |
| 2015/0251469 A1* | 9/2015 | Kasuga | B41J 11/46 347/110 |
| 2020/0257229 A1* | 8/2020 | Sato | G03G 15/2032 |

\* cited by examiner

IMAGE FORMING APPARATUS

FIELD

Embodiments described herein relate generally to an image forming apparatus.

BACKGROUND

In recent years, there is an image forming apparatus that forms an image on paper and writes data on an RFID tag embedded in the paper. When performing image formation on the paper and data writing on the RFID tag, the image forming apparatus confirms that the paper having the RFID tag is conveyed without overlapping with other paper.

The image forming apparatus of the related art detects whether or not the paper is in a state of being overlapped with other paper (double feed detection) and the RFID tag with sensors configured according to the respective detection purposes. However, if the sensor for detecting double feed and the sensor for detecting the RFID tag are provided separately, it is necessary to secure an installation place for each sensor in the image forming apparatus, which is costly.

DETAILED DESCRIPTION

In general, according to one embodiment, an image forming apparatus includes a conveyance system, a capacitance sensor, a processor, an image forming mechanism, and a tag writer. The conveyance system conveys paper. The capacitance sensor detects a value indicating the capacitance at a plurality of detection positions for the paper conveyed by the conveyance system. The processor detects that the paper conveyed by the conveyance system is provided with an RFID tag, and that the paper is being conveyed without overlapping with other paper based on the value indicating the capacitance detected at a plurality of detection positions by the capacitance sensor. If the processor detects that the paper is provided with an RFID tag and is conveyed without overlapping with other paper, the image forming mechanism forms an image on the paper. The tag writer writes data to the RFID tag provided on the paper on which the image forming mechanism forms the image. According to another embodiment, an image forming method involves detecting a value indicating capacitance at a plurality of detection positions for a paper conveyed by a conveyance system; determining that the paper conveyed by the conveyance system is provided with an RFID tag, and that the paper is being conveyed without overlapping with another paper based on the value indicating capacitance detected at the plurality of detection positions; forming an image on the paper if the paper is provided with the RFID tag and is conveyed without overlapping with the another paper; and writing data to the RFID tag provided on the paper on which the image is formed.

Hereinafter, the present embodiment will be described with reference to drawings.

First, the configuration of a digital multifunction apparatus (MFP, Multi-Functional Peripheral) 1 as the image forming apparatus according to the embodiment will be described.

Figure 1:
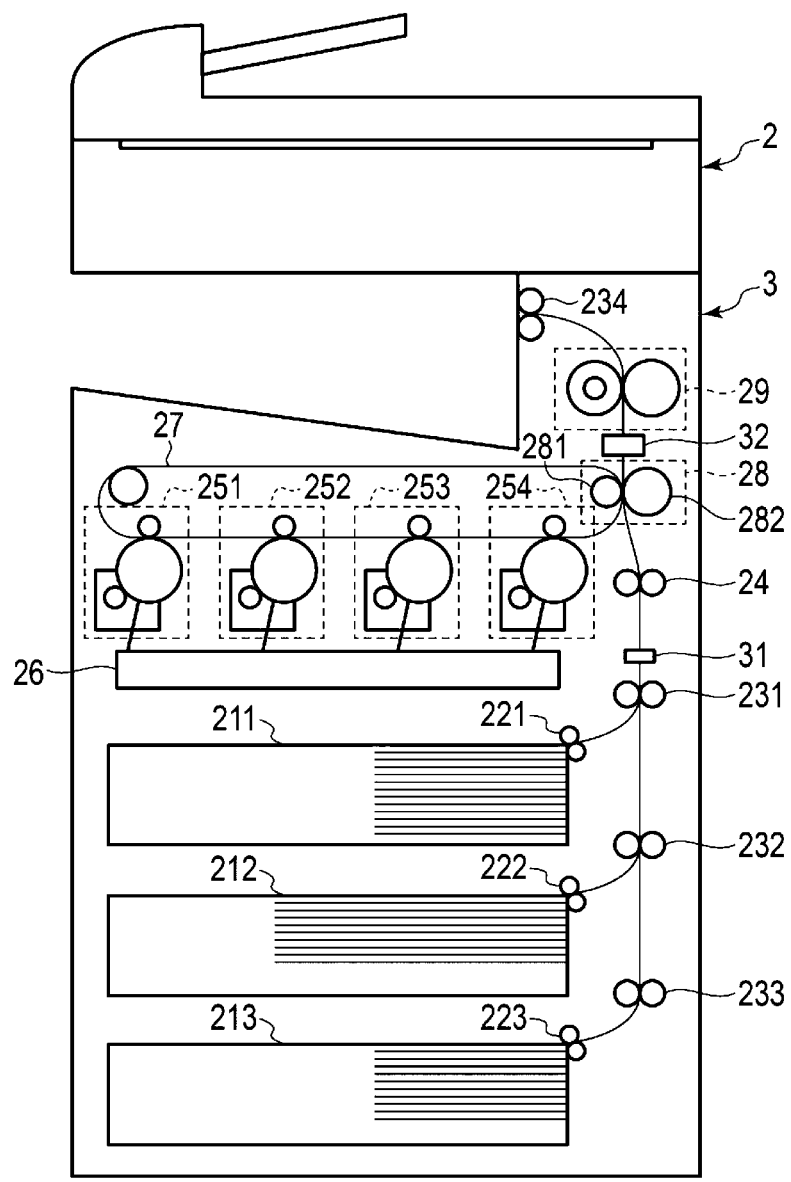
FIG. 1 is a perspective view illustrating an example of an external configuration of a digital multifunction apparatus as an image forming apparatus according to an embodiment.

FIG. 1 is a perspective view illustrating an example of an external configuration of a digital multifunction apparatus 1 as the image forming apparatus according to the embodiment.

As illustrated in FIG. 1, the digital multifunction apparatus 1 includes a scanner 2, a printer 3, and an operation panel 4.

The scanner 2 is installed on the upper part of the main body of the digital multifunction apparatus. The scanner 2 is a device that optically reads an image of an original. The scanner 2 reads the image of the original set on a platen or the image of the original conveyed by an automatic document feeder (ADF).

The printer 3 includes paper cassettes 211, 212, and 213. These paper cassettes 211, 212, and 213 store paper as an image-forming medium on which an image is printed. For example, each of the paper cassettes 211, 212, and 213 can be attached to and detached from the lower part of the main body of the digital multifunction apparatus. The paper cassettes 211, 212, and 213 include paper feed rollers 221, 222, and 223, respectively. Each of the paper feed rollers 221, 222, and 223 takes out one sheet of paper from each of the paper cassettes 211, 212, and 213.

The conveyance system 23 conveys the paper in the printer 3. The conveyance system 23 includes a plurality of conveyance rollers 231, 232, 233, and 234, a resist roller 24, and the like. The conveyance system 23 conveys the paper taken out by the paper feed rollers 221, 222, and 223 to the resist roller 24. The resist roller 24 conveys the paper to a transfer position at the timing of transferring the image.

A plurality of image forming units 25 (251, 252, 253, and 254) are image forming stations that form images of each of colors (yellow, magenta, cyan, and black), respectively. An exposure device 26 forms an electrostatic latent image as an image developed in each color on each image carrier in each of image forming units 25 (251, 252, 253, and 254). The exposure device 26 forms an electrostatic latent image on the image carrier by scanning the image carrier with light emitted according to the image data. For example, the exposure device 26 scans in the main scanning direction by irradiating a photoconductive drum as an image carrier through a polygon mirror that rotates the light emitted by a light emitting unit. Further, the irradiation position of the light from the exposure device 26 moves in the sub-scanning direction by rotating the photoconductive drum. That is, the position and magnification of the image formed by image forming unit 25 are adjusted by controlling the exposure device 26.

Each of the image forming units 25 (251, 252, 253, and 254) develops the electrostatic latent image on each image carrier with toner of each of colors (yellow, magenta, cyan, and black). An intermediate transfer belt 27 is an intermediate transfer body. Each image forming unit 25 transfers (primary transfer) the toner images of each color developed with toner of each color on the image carrier on the intermediate transfer belt 27.

The intermediate transfer belt 27 holds the transferred toner image and sends the image to a secondary transfer position. The secondary transfer position is a position where the toner image on the intermediate transfer belt 27 is transferred to the paper. The secondary transfer position is a position where a support roller 281 and a secondary transfer roller 282 face each other. The support roller 281 and the secondary transfer roller 282 form a transfer unit 28. The resist roller 24 conveys the paper to the secondary transfer position in time with the toner image on the intermediate transfer belt 27. The transfer unit 28 transfers the toner image held on the intermediate transfer belt 27 to the paper at the secondary transfer position.

For example, when forming a color image, each of the image forming units 251, 252, 253 and 254 transfers the toner images developed with toner of each of colors (yellow, magenta, cyan, and black) by overlapping the toner images on the intermediate transfer belt 27. The intermediate transfer belt 27 holds a color image in which toner images of each color are overlapped. The transfer unit 28 transfers the color image of a plurality of colors of toner on the intermediate transfer belt 27 to the paper at the secondary transfer position. The resist roller 24 conveys the paper to the secondary transfer position in time with the toner image on the intermediate transfer belt 27. As a result, the color image is transferred to the paper.

The transfer unit 28 supplies the paper on which the toner image is transferred to a fixing unit (fixing device) 29. The fixing unit 29 fixes the toner image on the paper. The fixing unit 29 includes, for example, a heating unit, a heat roller, and a pressurizing roller. The heating unit heats the heat roller. The heat roller and the pressurizing roller perform fixing processing in which the paper on which the toner image is transferred by the transfer unit 28 is heated in a pressurized state. The heat roller and the pressurizing roller in the fixing unit 29 feed the fixed paper to the conveyance roller 234. The conveyance roller 234 conveys the paper from the fixing unit 29 to a paper discharge unit 30.

The configuration example illustrated in FIG. 1 illustrates a configuration example when the image forming unit 25 is using an electrophotographic method. The image forming unit 25 may use an image forming method other than the electrophotographic method. For example, the image forming unit 25 may use an ink jet method. In the case of the ink jet method, the image forming unit 25 may be configured to form an image on the paper conveyed by the ink ejected by an ink jet head.

Further, in the digital multifunction apparatus 1 as the image forming apparatus according to the embodiment, a sensor (capacitance sensor) 31 is provided in front of the resist roller 24 in the paper conveying direction. The capacitance sensor 31 is a non-contact type sensor that uses an electric field. The capacitance sensor 31 includes a detection electrode, an oscillation circuit, a detection circuit, and the like. In the capacitance sensor 31, if an object enters the electric field (detection region) from the detection electrode, the oscillation frequency of the oscillation circuit changes due to the change in the capacitance of the electrode due to the object. The change in capacitance in the capacitance sensor 31 differs depending on the thickness of the object, the relative permittivity of the object, and the like.

In the capacitance sensor 31, the capacitance of the electrode changes depending on whether one sheet of paper has entered the electric field for detection (detection region) or a state in which a plurality of sheets are overlapped (double feed). If the detection region is set in the paper conveying path, the capacitance sensor 31 can detect double feed of paper based on the difference in capacitance between the case of one sheet and the case of a plurality of sheets. By increasing the detection region (sensor area), the capacitance sensor 31 can easily detect an object having a small capacitance such as paper with high accuracy.

The capacitance sensor 31 can also detect an object having a large capacitance such as an RFID tag. For example, the capacitance sensor 31 can detect an RFID tag embedded in a part of paper. By reducing the detection region, the capacitance sensor 31 can easily detect an object having a large capacitance such as an RFID tag embedded in a part of paper.

In the present embodiment, the capacitance sensor 31 is configured to detect the difference in capacitance in order to detect the double feed of the paper and the RFID tag contained in the paper. The capacitance sensor 31 includes a plurality of sensor groups (sensors that divide the detection region into a plurality of parts) arranged linearly in a direction (main scanning direction) orthogonal to the conveyance direction in the paper conveying path. A configuration example of the capacitance sensor 31 will be described in detail later.

Further, the digital multifunction apparatus 1 as the image forming apparatus according to the embodiment includes a tag reader and writer (tag writer) 32. The tag reader and writer 32 writes and reads data to and from the RFID tag. The tag reader and writer 32 is provided in the paper conveying path.

In the configuration example illustrated in FIG. 1, the tag reader and writer 32 is provided after the transfer unit 28 in the paper conveying path. In the configuration example illustrated in FIG. 1, the tag reader and writer 32 is configured to write (or read) data to (from) the RFID tag embedded in the paper on which the image is transferred by the transfer unit 28. The digital multifunction apparatus 1 illustrated in FIG. 1 can perform processing of forming an image on paper with an RFID tag and writing data to the RFID tag.

In the description of the present embodiment, paper with an RFID tag will be described on the assumption that the RFID tag is embedded in a predetermined position of the paper.

The operation panel 4 is a user interface. The operation panel 4 displays a guide and accepts input of operation buttons or icons. For example, a user inputs setting information on the operation panel 4. The operation panel 4 includes a display unit (display) 41, a touch panel 42, and a plurality of operation buttons 43. For example, the touch panel 42 is provided on the display screen of the display unit 41. The touch panel 42 detects a site touched by the user on the display screen of the display unit 41.

Next, the configuration of a control system in the digital multifunction apparatus configured as described above will be described.

Figure 2:
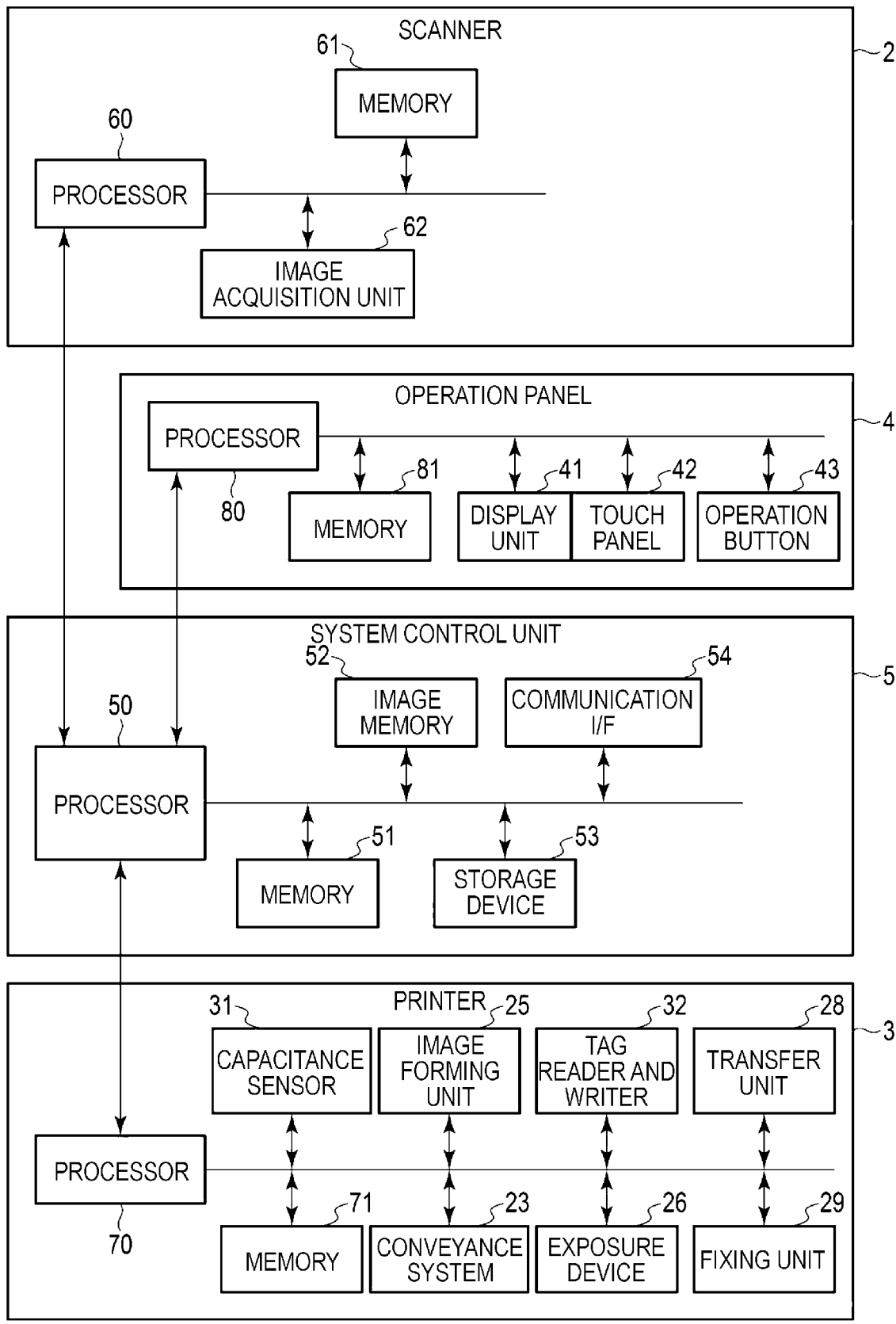
FIG. 2 is a block diagram illustrating a configuration example of a control system in the digital multifunction apparatus as the image forming apparatus.

FIG. 2 is a block view illustrating a configuration example of the control system in the digital multifunction apparatus 1 according to the embodiment.

The digital multifunction apparatus 1 includes a system control unit 5 that controls the entire apparatus. The system control unit 5 connects to the scanner 2, the printer 3, and the operation panel 4. In the configuration example illustrated in FIG. 2, the system control unit 5 includes a processor 50, a memory 51, an image memory 52, a storage device 53, a communication interface (I/F) 54, and the like.

The processor 50 connects to a processor 60 of the scanner 2, a processor 70 of the printer 3, and a processor 80 of the operation panel 4 via an interface. The processor 50 realizes various processing functions by executing a program stored in the memory 51 or the storage device 53. For example, the processor 50 outputs an operation instruction to each part or processes various information from each part by executing the program stored in the memory 51.

The memory 51 includes memories such as random access memory (RAM), read-only memory (ROM), and NVM. The RAM functions as working memory or buffer memory. The ROM is a non-volatile memory that cannot be rewritten. The ROM functions as a program memory. The NVM is a rewritable non-volatile memory. The NVM stores setting data and the like.

The image memory 52 stores image data. For example, the image memory 52 functions as a page memory for expanding the image data to be processed.

The storage device 53 stores data such as control data, a control program, and setting information. The storage device 53 is composed of a rewritable non-volatile memory. For example, the storage device 53 is composed of a storage device such as a hard disk drive (HDD) or a solid state drive (SSD).

A communication I/F 54 is an interface for performing data communication with an external apparatus. For example, the communication I/F 54 functions as an image acquisition unit that acquires an image to be printed on paper from an external apparatus such as a PC.

Next, a configuration example of the control system in the scanner 2 will be described.

As illustrated in FIG. 2, the scanner 2 includes the processor 60, a memory 61, an image reading unit (image reading mechanism) 62, and the like.

The processor 60 realizes various processing by executing the program stored in the memory 61. For example, the processor 60 controls the operation of each part in the scanner 2 and monitors the operation status of each part by executing the program. Further, the processor 60 is connected to the processor 50 of the system control unit 5 via the interface. The processor 60 executes scan processing in response to an operation instruction from the system control unit 5.

The memory 61 includes a memory such as a random access memory (RAM), a read-only memory (ROM), and a data memory. The RAM functions as working memory or buffer memory. The ROM is a non-volatile memory that cannot be rewritten. The ROM functions as a program memory. The data memory is a rewritable non-volatile memory.

The image reading unit 62 reads the image of the original set on the platen. Further, the image reading unit 62 may include a configuration for reading an image of the original conveyed by the ADF. The image reading unit 62 includes an illumination, an optical system, a photoelectric conversion unit, and the like. The illumination irradiates the original surface with light. The optical system guides the reflected light from the original surface to the photoelectric conversion unit. The photoelectric conversion unit converts the light from the original surface into an electric signal. The image reading unit 62 outputs the image data of the original as the scanning result of the image of the original.

Next, a configuration example of the control system in the printer 3 will be described.

As illustrated in FIG. 2, the printer 3 includes the processor 70, a memory 71, a conveyance system 23, the image forming unit (image forming mechanism) 25, the exposure device 26, the transfer unit 28, the fixing unit 29, the capacitance sensor (sensor) 31, the tag reader and writer 32, and the like.

The processor 70 realizes various processing by executing the program stored in the memory 71. For example, the processor 70 controls the operation of each part in the printer 3 and monitors the operation status of each part by executing the program. Further, the processor 70 is connected to the processor 50 of the system control unit 5 via the interface. The processor 70 executes print processing or the like in response to an operation instruction from the system control unit 5.

The memory 71 includes a memory such as a random access memory (RAM), a read-only memory (ROM), and a data memory. The RAM functions as working memory or buffer memory. The ROM is a non-volatile memory that cannot be rewritten. The ROM functions as a program memory. The data memory is a rewritable non-volatile memory.

The conveyance system 23 conveys paper in the printer 3 under the control of the processor 70. The conveyance system 23 takes in the paper in the paper feed cassettes 211, 212, and 213 one by one. The conveyance system 23 conveys the taken paper to the resist roller 24 that conveys the taken paper. The conveyance system 23 supplies the paper to the transfer unit at a predetermined timing by driving the resist roller 24 in response to an operation instruction from the processor 70.

In the configuration example illustrated in FIG. 1, the image forming units 25 (251, 252, 253, and 254) form an image of each color by an electrophotographic method. The image forming unit 25 illustrated in FIG. 1 includes a photoconductive drum and a developing device. In the image forming unit 25, the photoconductive drum and the developing device operate in response to an operation instruction from the processor 70. The exposure device 26 forms an electrostatic latent image on the photoconductive drum in response to an operation instruction from the processor 70. The developing device develops the electrostatic latent image on the photoconductive drum with toner of each color. Further, the developed image on the photoconductive drum is transferred to the intermediate transfer belt 27.

The transfer unit 28 transfers (secondary transfer) the developed image transferred to the intermediate transfer belt 27 to paper in response to an operation instruction from the processor 70. The fixing unit 29 drives the heat roller and the pressurizing roller in response to an operation instruction from the processor 70. The fixing unit 29 heats the paper on which the developed image is transferred in a pressurized state. As a result, the developed image is fixed on the paper.

The capacitance sensor 31 is a non-contact type sensor that uses an electric field. As will be described later, the capacitance sensor 31 detects a value indicating the capacitance at a plurality of detection positions arranged in the main scanning direction with respect to the paper. The capacitance sensor 31 supplies a value indicating the capacitance at each detection position to the processor 50 of the system control unit 5. The processor 50 detects the double feed of paper and the presence or absence of an RFID tag based on the value indicating the capacitance at each detection position acquired from the capacitance sensor 31. For example, the processor 50 determines the double feed of paper based on the capacitance at each detection position detected by the capacitance sensor 31 as the paper is conveyed. Further, the processor 50 detects the presence or absence of an RFID tag based on the capacitance of the detection position corresponding to the installation position of the RFID tag on the conveyed paper.

The tag reader and writer 32 writes and reads data to and from the RFID tag embedded in the paper to be conveyed according to the instruction of the processor 70. For example, the tag reader and writer 32 acquires data to be written to the RFID tag from the processor 50 via the processor 70. The tag reader and writer 32 writes the specified data to the RFID tag of the paper on which an image is formed by the image forming unit 25. Further, the tag reader and writer 32 may read the data recorded on the RFID tag of the paper. The tag reader and writer 32 supplies the data read from the RFID tag on the paper to the processor 50 via the processor 70.

Next, a configuration example of the control system on the operation panel 4 will be described.

As illustrated in FIG. 2, the operation panel 4 includes the processor 80, a memory 81, the display unit (display) 41, the touch panel 42, the operation buttons 43, and the like.

The processor 80 realizes various processing by executing the program stored in the memory 81. For example, the processor 80 controls the operation of each part of the operation panel 4 and monitors the operation status of each part by executing the program. Further, the processor 80 is connected to the processor 50 of the system control unit 5 via the interface. For example, the processor 80 notifies the system control unit 5 of the information input by a user.

The memory 81 includes memories such as a random access memory (RAM), a read-only memory (ROM), and a data memory. The RAM functions as working memory or buffer memory. The ROM is a non-volatile memory that cannot be rewritten. The ROM functions as a program memory. The data memory is a rewritable non-volatile memory.

The display content of the display unit 41 is controlled in response to an operation instruction from the processor 80. For example, the display unit 41 displays an error message in response to an operation instruction from the processor 80. The touch panel 42 is provided on the display screen of the display unit 41, and detects a touch position on the display screen. For example, the processor 80 displays an icon that can be selected on the touch panel 42 on the display screen of the display unit 41 together with the operation guide. The processor 80 determines the information input by a user according to the touch position detected by the touch panel 42. The operation button 43 is composed of hard keys such as a start key and a reset key.

Next, the configuration of the capacitance sensor 31 in the digital multifunction apparatus 1 as the image forming apparatus according to the embodiment will be described.

Figure 3:
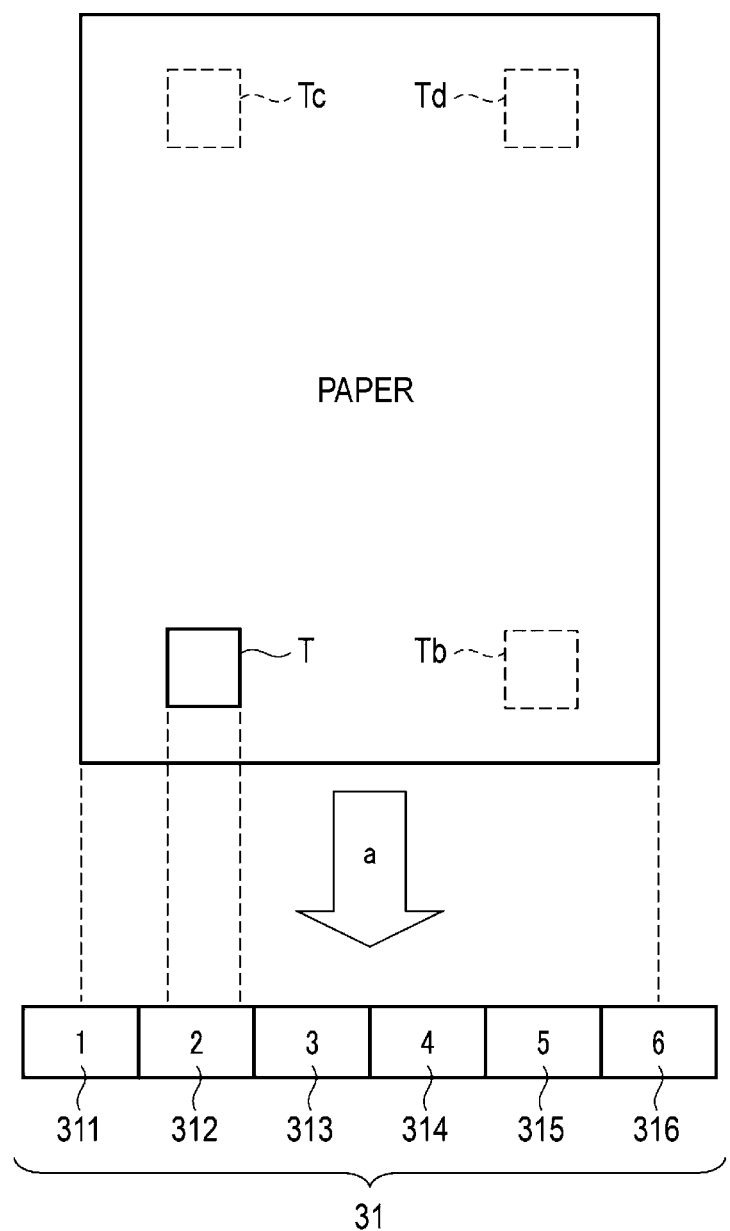
FIG. 3 is a diagram illustrating a configuration example of a capacitance sensor in the digital multifunction apparatus as the image forming apparatus.

FIG. 3 is a diagram illustrating a configuration example of the capacitance sensor 31 included in the digital multifunction apparatus 1 as the image forming apparatus according to the embodiment.

As illustrated in FIG. 3, the capacitance sensor 31 is provided with a plurality of detection positions in a direction (main scanning direction) orthogonal to the paper conveying direction (arrow a illustrated in the figure). The capacitance sensor 31 has a configuration in which a plurality of detection positions are arranged in the main scanning direction. For example, the capacitance sensor 31 divides the capacitance detection positions into a plurality of parts in the main scanning direction. Further, the capacitance sensor 31 may include a plurality of capacitance sensors arranged in the main scanning direction so as to correspond to the detection positions in the main scanning direction.

The width of the capacitance sensors 31 in the main scanning direction is configured to correspond to a size corresponding to the width of the paper (the size in the main scanning direction of the paper) so that the entire paper can be detected. As a result, the capacitance sensor 31 can be configured to detect the capacitance of the entire paper conveyed at the plurality of detection positions.

The plurality of detection positions of the capacitance sensor 31 are set according to the size and position of the RFID tag provided on the paper. The plurality of detection positions of the capacitance sensor 31 may be configured so that the RFID tag provided at a predetermined position on the paper can be detected. As a result, the capacitance sensor can also detect the capacitance of the RFID tag included in the paper to a limited extent.

In the configuration example illustrated in FIG. 3, the capacitance sensor 31 detects the capacitance at six detection positions (311 to 316) arranged in the main scanning direction. Further, in the example illustrated in FIG. 3, the paper is provided with an RFID tag at a predetermined position T. The detection position 312 of the capacitance sensor 31 is located at a position corresponding to a predetermined position where the RFID tag is installed on the paper in the conveyed state illustrated in FIG. 3.

Further, the position of the RFID tag provided on the paper may be any of a position Tb, a position Tc, or a position Td depending on the conveyed state of the paper.

The RFID tags at the positions T and Tc illustrated in FIG. 3 are detected at the detection position 312 of the capacitance sensor 31. Further, if the paper is conveyed in a conveyance direction a, the processor 50 can identify the position of the RFID tag from the timing when the detection position 312 of the capacitance sensor 31 detects the RFID tag. For example, the processor 50 can identify whether the RFID tag is in the position T or the position Tc by the time from the detection of the tip of the paper at the detection position 312 to the detection of the RFID tag.

The RFID tags at the positions Tb and Td illustrated in FIG. 3 are detected at the detection position 315 of the capacitance sensor 31. If the paper is conveyed in the conveyance direction a, the processor 50 can identify the position of the RFID tag from the timing when the detection position 315 of the capacitance sensor 31 detects the RFID tag. For example, the processor 50 can identify whether the RFID tag is at the position Tb or the position Td by the time from the detection of the tip of the paper at the detection position 315 to the detection of the RFID tag.

Next, the operation of the digital multifunction apparatus 1 according to the embodiment will be described.

Figure 4:
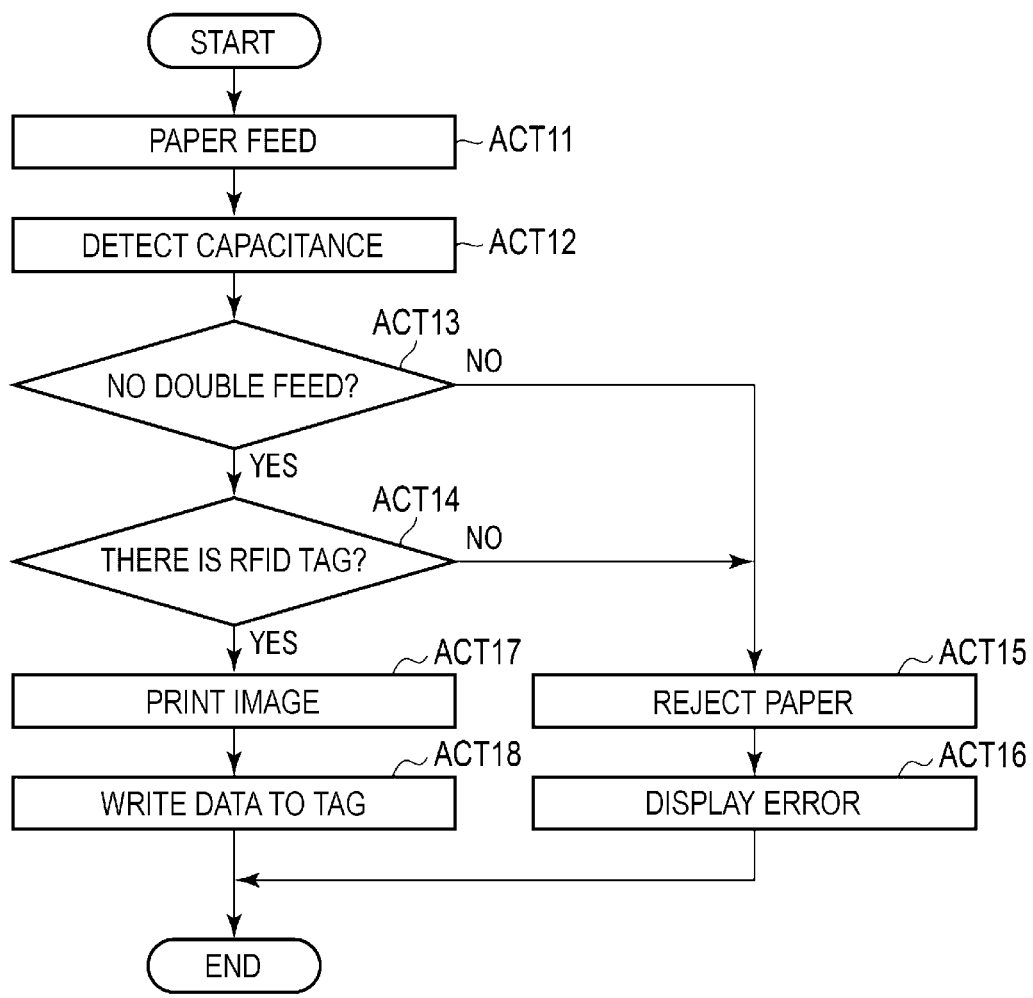
FIG. 4 is a flowchart illustrating an operation example of the digital multifunction apparatus as the image forming apparatus.

FIG. 4 is a flowchart illustrating an operation example when the digital multifunction apparatus 1 prints an image and writes data on the paper with an RFID tag.

First, it is assumed that the processor 50 of the system control unit 5 in the digital multifunction apparatus 1 acquires the image data to be printed on paper and the data to be written in the RFID tag included in the paper. For example, the processor 50 acquires image data and write data from an external apparatus such as a PC that communicates via the communication interface 54.

If the processor 50 acquires the image data to be formed on the paper and the data to be written on the RFID tag, the processor 50 feeds the paper with the RFID tag from a cassette (ACT 11). For example, the processor 50 instructs the processor 70 to feed the paper by specifying a cassette set to store the paper with an RFID tag. As a result, the printer 3 executes an operation of feeding paper from the specified cassette by using the conveyance system 23. In the printer 3, the paper fed from the cassette is conveyed to the front of the resist roller 24 by the conveyance system 23.

The processor 50 detects the capacitance at each detection position by the capacitance sensor 31 while conveying the fed paper (ACT 12). The capacitance sensor 31 detects a value indicating the capacitance at respective detection positions arranged in the main scanning direction. For example, the capacitance sensor 31 detects a value indicating the capacitance at each detection position at a predetermined cycle according to the paper conveying speed. The capacitance sensor 31 supplies a value indicating the capacitance detected at each detection position to the processor 50 via the processor 70. As a result, the processor 50 acquires a value indicating the capacitance detected by the capacitance sensor 31 at each detection position with respect to the paper.

If the capacitance sensor 31 acquires a value indicating the capacitance detected at each detection position, the processor 50 determines whether or not a plurality of sheets of paper to be conveyed are stacked (double feed) (ACT 13). The processor 50 determines whether or not the paper is double-fed based on the value indicating the capacitance detected by the capacitance sensor 31 at each detection position.

For example, the memory 51 or the storage device 53 stores a value detected by the capacitance sensor 31 as a reference value if one sheet of paper is conveyed. The processor 50 determines whether or not the paper is double-fed by comparing the value detected by the capacitance sensor 31 with the reference value.

Further, the processor 50 may determine the presence or absence of double feed based on the value (total value) obtained by adding the values indicating the capacitance detected at each detection position of the capacitance sensor 31 in the main scanning direction. In this case, the processor 50 calculates the total value obtained by adding the values detected by the capacitance sensor 31 at each detection position. The processor 50 determines whether or not the paper is double-fed by comparing the total value with the reference value for the total value (the total value if one sheet of paper is detected). If the values detected by the capacitance sensor 31 at each detection position are added up, the change in capacitance can be easily detected even on paper having a small amount of capacitance, and double feed can be accurately determined.

The processor 50 may group a plurality of detection positions of the capacitance sensors 31 and determine whether or not the paper is double-fed based on the total value of each group. As a result, the processor 50 can detect the change in capacitance for each grouped region, and can determine the double feed of the paper for each region.

If it is determined that a plurality of sheets of paper are being conveyed in a state of being overlapped, that is, if the double feed of the sheets is detected (ACT 13, NO), the processor 50 rejects the paper without printing an image (ACT 15). If the double feed of paper is detected, the processor 50 displays a guide (error message) indicating that the double feed of paper is detected on the display unit 41 (ACT 16). As a result, the digital multifunction apparatus 1 can notify the user that the paper is rejected because the double feed of paper is detected.

If it is determined that there is no double feed of paper (ACT 13, YES), the processor 50 determines whether or not the conveyed paper is provided with an RFID tag (ACT 14). The processor 50 determines whether or not there is an RFID tag on the paper based on a value indicating the capacitance detected by the capacitance sensor 31 at each detection position.

In the present embodiment, it is assumed that an RFID tag is embedded in a predetermined position of the paper. In this case, the processor 50 determines whether or not there is an RFID tag based on the value indicating the capacitance detected at the detection position corresponding to the predetermined position in which the RFID tag is embedded.

The processor 50 detects the presence or absence of an RFID tag by the capacitance at the detection positions corresponding to the positions where RFID tags are arranged among the plurality of detection positions in the main scanning direction. In general, RFID tags have a larger capacitance than paper. Therefore, the processor 50 can accurately detect whether or not there is an RFID tag on the paper based on the change in the capacitance at the detection position corresponding to the predetermined position where the RFID tag is installed.

If it is determined that there is no RFID tag on the paper (ACT 14, NO), the processor 50 rejects the paper without printing an image (ACT 15). If it is determined that there is no RFID tag on the paper, the processor 50 displays a guide (error message) indicating that no RFID tag is detected on the display unit 41 (ACT 16). As a result, the digital multifunction apparatus 1 can notify the user that the paper is rejected because no RFID tag can be detected.

If it is determined that there is an RFID tag on the paper (ACT 14, YES), the processor 50 forms an image on the paper (ACT 17). That is, if the processor 50 determines that there is an RFID tag on the paper (ACT 14, YES), it is assumed that the paper provided with the RFID tag can be conveyed with no double feed. In this case, in the processor 50, the resist roller 24 supplies the paper to the transfer unit in accordance with the transfer timing. As a result, the image formed by the image forming unit 25 is transferred to the paper with no double feed on which the presence of the RFID tag is confirmed by the transfer unit 28 via the intermediate transfer body.

After transferring the image to the paper, the processor 50 writes the data to the RFID tag provided on the paper by the tag reader and writer 32 (ACT 18). After confirming that the paper provided with the RFID tag is conveyed with no double feed, the processor 50 prints an image on the paper and writes the data to the RFID tag. As a result, the printer 3 of the digital multifunction apparatus 1 can reliably print an image on the paper and write the data to the RFID tag of the paper.

As described above, in the digital multifunction apparatus as the image forming apparatus according to the embodiment, the capacitance sensors are disposed at a plurality of detection positions arranged in a direction orthogonal to the paper conveying direction (main scanning direction). The capacitance sensors are provided at a plurality of detection positions with a width that matches the paper width in the main scanning direction. Further, the capacitance sensors are configured at a plurality of detection positions so that the position corresponding to the RFID tag disposed at a predetermined position on the paper is a detection position. The processor determines whether or not the paper is double-fed based on the sum of the values indicating the capacitance detected at the plurality of detection positions. Further, the processor determines whether or not the paper is provided with an RFID tag based on the value indicating the capacitance detected at the detection position corresponding to the installation position of the RFID tag on the paper.

As a result, according to the image forming apparatus according to the embodiment, detection of double feed of paper and detection of an RFID tag on the paper can be performed by the capacitance detected by the capacitance sensors at a plurality of detection positions. As a result, the image forming apparatus does not need to separately install the sensor for detecting double feed and the sensor for detecting an RFID tag. Further, in the image forming apparatus according to the embodiment, since the detection of double feed and detection of an RFID tag can be realized by one capacitance sensor, it is possible to easily install the sensor, suppressing the cost.

Further, in the image forming apparatus according to the embodiment, the capacitance sensor is disposed in front of the resist roller that supplies the paper to the transfer unit. Thereby, the image forming apparatus according to the embodiment can detect double feed and the presence or absence of an RFID tag before printing an image on the paper.

Further, the image forming apparatus according to the embodiment detects double feed before printing an image, and detects the presence or absence of an RFID tag before printing an image on paper without using the tag reader and writer. Thereby, the image forming apparatus according to the embodiment can determine the presence or absence of an RFID tag before the paper reaches the installation position of the tag reader and writer. As a result, the image forming apparatus according to the embodiment can discharge the paper with no RFID tag without printing an image before the paper reaches the installation position of the tag reader and writer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
    a conveyance system that conveys paper;
    a capacitance sensor that detects a value indicating capacitance at a plurality of detection positions for the paper conveyed by the conveyance system;
    a processor that determines that the paper conveyed by the conveyance system is provided with an RFID tag, and that the paper is being conveyed without overlapping with another paper based on the value indicating capacitance detected by the capacitance sensor at the plurality of detection positions;
    an image forming mechanism that forms an image on the paper if the processor detects that the paper is provided with the RFID tag and is conveyed without overlapping with the another paper; and
    a tag writer that writes data to the RFID tag provided on the paper on which the image forming mechanism forms the image.

2. The image forming apparatus according to claim 1, wherein
    the capacitance sensor detects the value indicating the capacitance at the plurality of detection positions arranged in a direction orthogonal to a paper conveying direction in a conveyance path along which the paper is conveyed by the conveyance system.

3. The image forming apparatus according to claim 2, wherein
    the processor determines the RFID tag is provided on the paper based on the capacitance detected at a detection position corresponding to a position through which the RFID tag provided at a predetermined position on the paper conveyed by the conveyance system passes.

4. The image forming apparatus according to claim 2, wherein
    the processor determines whether or not the paper conveyed by the conveyance system is in a state of overlapping with the another paper based on the value indicating the capacitance detected at the plurality of detection positions.

5. The image forming apparatus according to claim 4, wherein
    the processor determines the RFID tag is provided on the paper based on the capacitance detected at a detection position corresponding to a position through which the RFID tag provided at a predetermined position on the paper conveyed by the conveyance system passes.

6. The image forming apparatus according to claim 4, wherein
    the processor determines whether or not the paper conveyed by the conveyance system overlaps with the another paper based on a total value obtained by adding values indicating the capacitance detected at the plurality of detection positions.

7. The image forming apparatus according to claim 6, wherein
    the processor determines the RFID tag is provided on the paper based on the capacitance detected at a detection position corresponding to a position through which the RFID tag provided at a predetermined position on the paper conveyed by the conveyance system passes.

8. The image forming apparatus according to claim 1, wherein
    the processor stops forming an image on the paper if the paper conveyed by the conveyance system overlaps with the another paper or if an absence of the RFID tag is determined on the paper.

9. The image forming apparatus according to claim 8, wherein
    if it is determined that the paper conveyed by the conveyance system is in a state of being overlapped with the another paper, the processor displays an error message indicating that a plurality of sheets of paper are conveyed in the state of being overlapped on a display.

10. The image forming apparatus according to claim 8, wherein
    if an absence of the RFID tag is determined in the paper conveyed by the conveyance system, the processor displays an error message indicating that no RFID tag is detected in the paper conveyed by the conveyance system on a display.

11. An image forming method, comprising:
    detecting a value indicating capacitance at a plurality of detection positions for a paper conveyed by a conveyance system;
    determining that the paper conveyed by the conveyance system is provided with an RFID tag, and that the paper is being conveyed without overlapping with another paper based on the value indicating capacitance detected at the plurality of detection positions;
    forming an image on the paper if the paper is provided with the RFID tag and is conveyed without overlapping with the another paper; and
    writing data to the RFID tag provided on the paper on which the image is formed.

12. The image forming method according to claim 11, further comprising:
    detecting the value indicating the capacitance at the plurality of detection positions arranged in a direction orthogonal to a paper conveying direction in a conveyance path along which the paper is conveyed by the conveyance system.

13. The image forming method according to claim 12, further comprising:
determining the RFID tag is provided on the paper based on the capacitance detected at a detection position corresponding to a position through which the RFID tag provided at a predetermined position on the paper conveyed by the conveyance system passes.

14. The image forming method according to claim 12, further comprising:
determining whether or not the paper conveyed by the conveyance system is in a state of overlapping with the another paper based on the value indicating the capacitance detected at the plurality of detection positions.

15. The image forming method according to claim 14, further comprising:
determining the RFID tag is provided on the paper based on the capacitance detected at a detection position corresponding to a position through which the RFID tag provided at a predetermined position on the paper conveyed by the conveyance system passes.

16. The image forming method according to claim 14, further comprising:
determining whether or not the paper conveyed by the conveyance system overlaps with the another paper based on a total value obtained by adding values indicating the capacitance detected at the plurality of detection positions.

17. The image forming method according to claim 16, further comprising:
determining the RFID tag is provided on the paper based on the capacitance detected at a detection position corresponding to a position through which the RFID tag provided at a predetermined position on the paper conveyed by the conveyance system passes.

18. The image forming method according to claim 11, further comprising:
stopping forming an image on the paper if the paper conveyed by the conveyance system overlaps with the another paper or if an absence of the RFID tag is determined on the paper.

19. The image forming method according to claim 18, further comprising:
if it is determined that the paper conveyed by the conveyance system is in a state of being overlapped with the another paper, displaying an error message indicating that a plurality of sheets of paper are conveyed in the state of being overlapped.

20. The image forming method according to claim 18, further comprising:
if an absence of the RFID tag is determined in the paper conveyed by the conveyance system, displaying an error message indicating that no RFID tag is detected in the paper conveyed by the conveyance system.

* * * * *